United States Patent [19]

Underwood

[11] Patent Number: 5,245,878
[45] Date of Patent: Sep. 21, 1993

[54] VEGETATION MAINTENANCE SYSTEM

[76] Inventor: John P. Underwood, 42 West Vogel, Phoenix, Ariz. 85021

[21] Appl. No.: 729,185

[22] Filed: Jul. 12, 1991

[51] Int. Cl.$^5$ ............................................. E21B 49/02
[52] U.S. Cl. ............................... 73/864.44; 73/864.45; 73/864.62; 175/20
[58] Field of Search ............ 73/864.44, 864.45, 864.62; 175/20, 58

[56] References Cited

U.S. PATENT DOCUMENTS

| | | | |
|---|---|---|---|
| D. 269,844 | 7/1983 | Hackerson | 73/864.44 X |
| 1,008,904 | 11/1911 | Harden et al. | 73/864.44 X |
| 1,027,246 | 5/1912 | Granville | 73/864.44 X |
| 1,162,901 | 12/1915 | Cantley | 73/864.44 X |
| 1,847,136 | 3/1932 | Rauberstauch | 73/864.44 X |
| 2,083,153 | 6/1937 | Irish | 117/7.1 |
| 2,108,195 | 2/1938 | Crow | 73/864.44 X |
| 3,273,930 | 9/1966 | Gottfried | 73/864.44 X |
| 3,326,049 | 6/1967 | Eley | 73/864.44 X |
| 3,444,938 | 5/1969 | Ballmann | 73/864.44 X |
| 4,096,749 | 6/1978 | Stewart | 73/864.45 |
| 4,106,576 | 8/1978 | Clements | 73/864.44 X |
| 4,117,896 | 10/1978 | Weber | 73/864.44 X |
| 4,346,612 | 8/1982 | Rond | 73/864.44 |
| 4,498,547 | 12/1985 | Herkness | 73/864.44 |
| 5,005,433 | 4/1991 | Patton | 73/864.44 |

*Primary Examiner*—Tom Noland
*Attorney, Agent, or Firm*—Don J. Flickinger; Jordan M. Meschkow; Robert A. Parsons

[57] ABSTRACT

A vegetation maintenance system includes a soil extraction tool, used to diagnose and treat the soil surrounding an ailing plant, and a plant guard, for protecting the plant from external damage before, during and after treatment. The soil extraction tool consists of an segmented shaft carrying a tubular member having a sharpened, open lower end and a longitudinally extending opening. A plunger is provided for forcibly ejecting soil from the tubular member. The plant guard is a semi-rigid sheet of material having integrally formed fasteners for detachably securing the opposite ends of the sheet in adjustable, overlapping relationship to one another to form a tubular sheath for surrounding a plant.

13 Claims, 2 Drawing Sheets

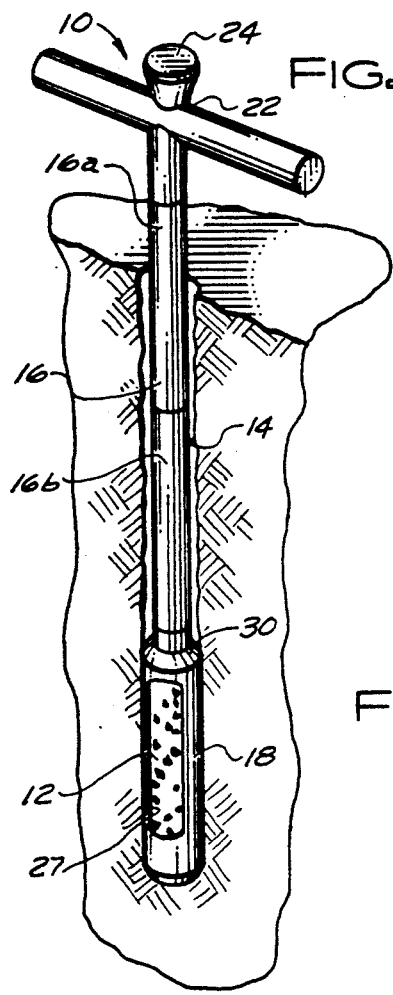
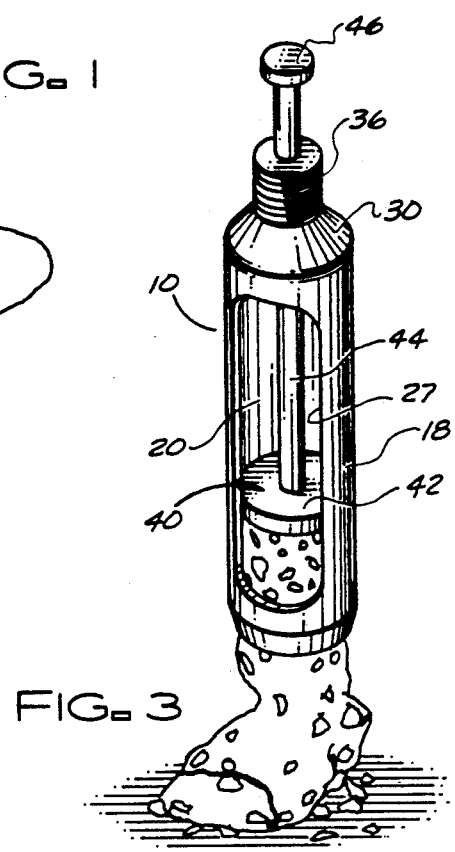
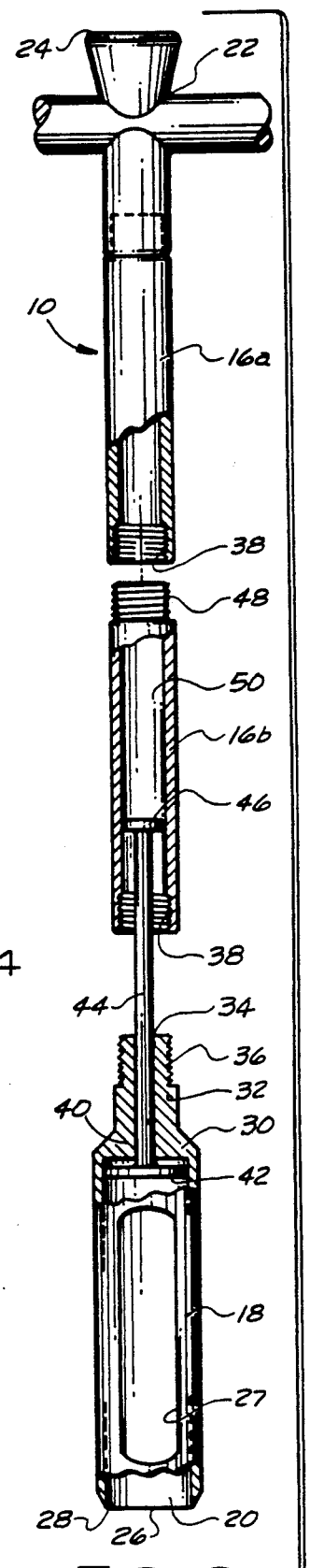
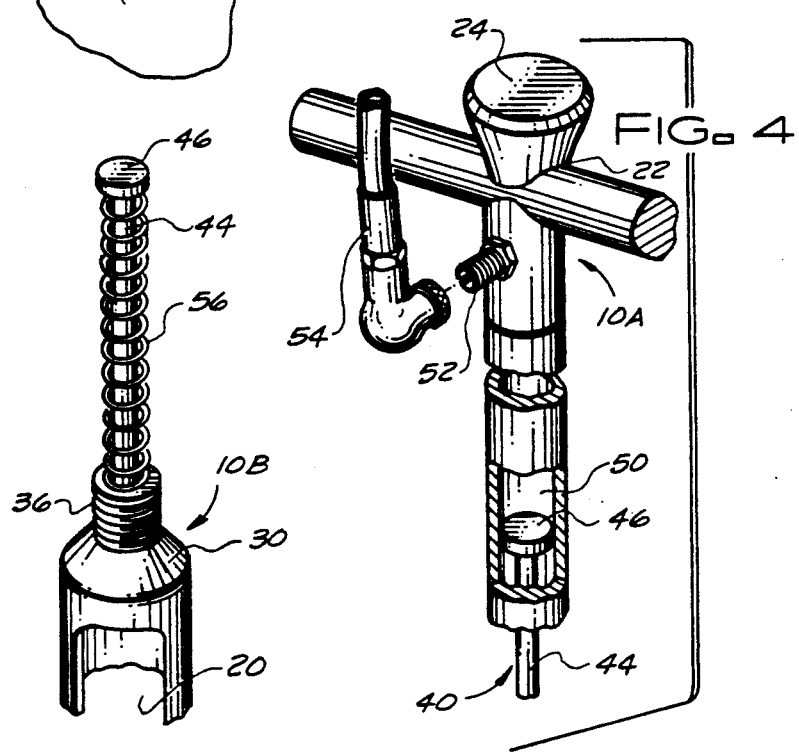
FIG. 1
FIG. 3
FIG. 4
FIG. 5
FIG. 2

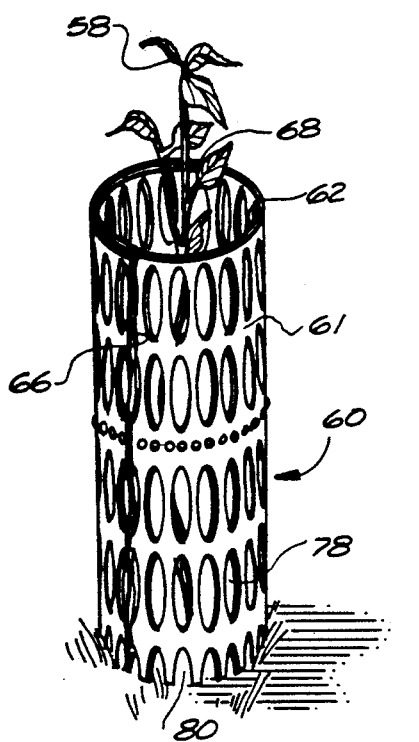
FIG. 6
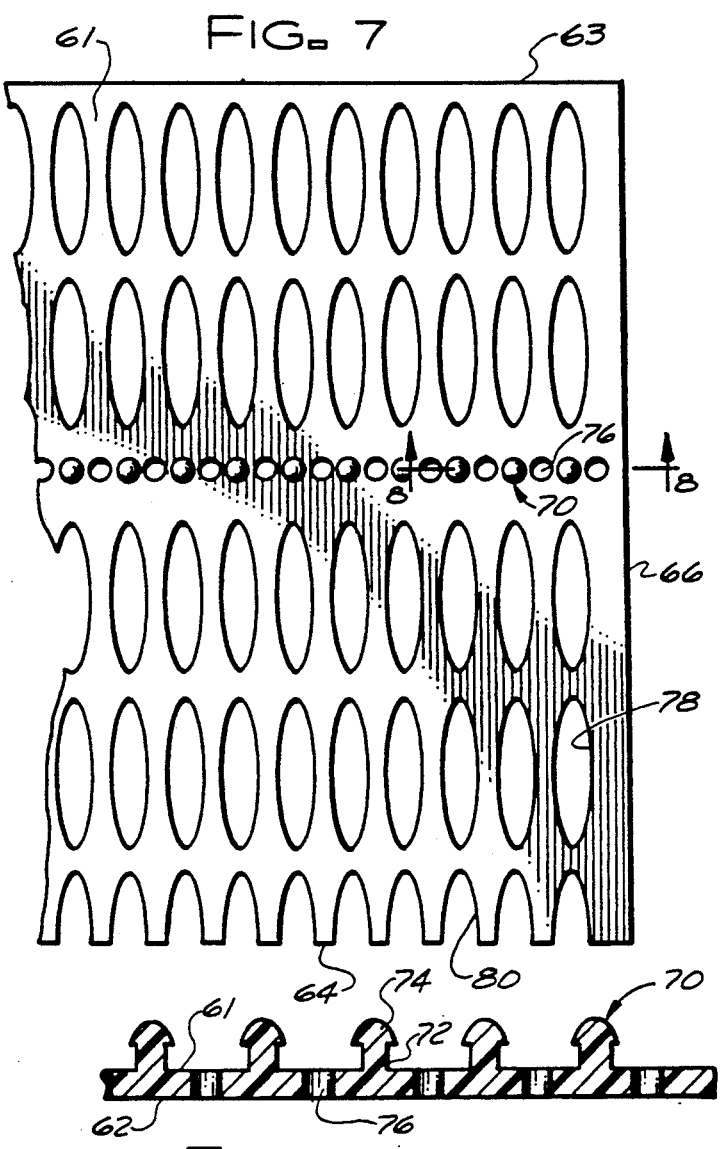
FIG. 7
FIG. 8
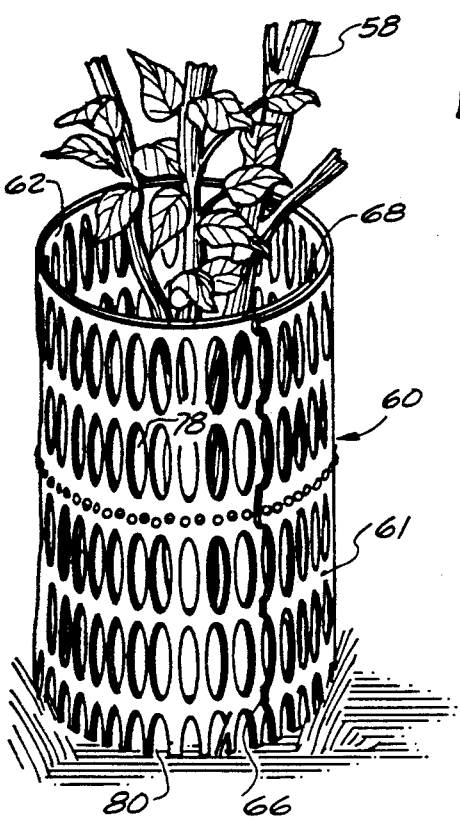
FIG. 9
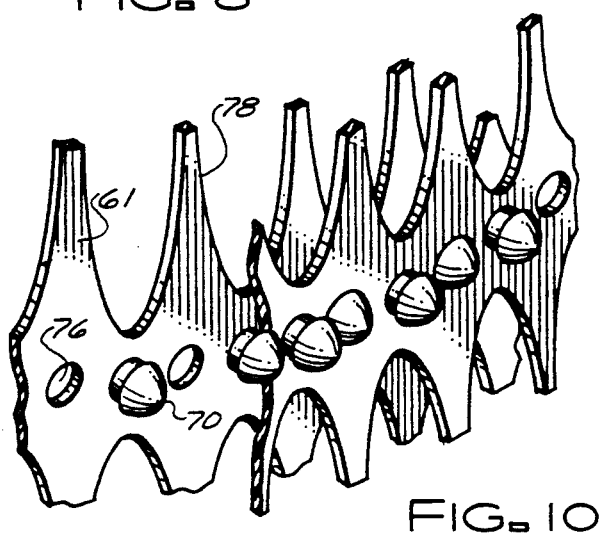
FIG. 10

VEGETATION MAINTENANCE SYSTEM

BACKGROUND OF THE INVENTION

1. Field of the Invention

This invention relates to the art of landscape maintenance.

More particularly, this invention relates to a system for ensuring the healthy growth of vegetation such as trees.

In a further and more specific aspect, the instant invention concerns a landscape maintenance system including a soil extraction tool and a guard for protecting plants from string trimmers and the like.

2. Description of the Prior Art

The survival of young plants, such as trees, shrubs, vegetables, and flowers, is dependent on a large number of environmental factors. Among such factors are the quality of the soil in which the plants are established, the amount of water and nutrients available, and the presence or absence of protection from externally inflicted damage by humans and/or animals. Constant, careful maintenance is required to control these factors if the good health and longevity of the plants is to be ensured.

A complete plant maintenance program consists of three major components. First, the soil must be tested to determine its quality, or to diagnose any deficiencies which may prevent a plant from flourishing. Second, the soil must be enhanced by adding water, nutrients, and any other additives needed to remedy whatever deficiencies have been identified. Third, the plant and its environment must be protected from outside damage. Different tools are utilized for each of these components of a plant maintenance system.

The sampling and analysis component of a plant maintenance program is commonly performed with the aid of a sampler comprising an elongated tubular member secured to an elongated shaft having a T-handle. The bottom end of the tubular member is provided with a sharpened edge or point for penetrating the ground. To extract a soil sample, a user drives the tubular member into the ground by bearing down on the T-handle. Soil then enters the sampler through a longitudinal opening in the tube, forming a plug. After the sampler is withdrawn from the ground, the plug is shaken, knocked or scraped from the tube as necessary.

Prior art sampling devices have suffered from a number of disadvantages. For example, many devices require excessive force for driving the sample tube into the ground and subsequently pulling it out again, particularly when the ground is hard. This can result in bodily injuries to the user. In addition, most sampling devices lack any type of provision for completely ejecting a plug from the tube. Thus, portions of old soil plugs may mix with and contaminate the most recent plug, making accurate analysis impossible.

The soil enhancement component of a plant maintenance program requires a variety of tools for penetrating the soil and delivering nutrients as close as possible to the feeder roots of a plant. Such tools include spades, shovels, and boring devices for digging to the appropriate depth, and pipes, hoses, and other conduits for delivering water and nutrients once that depth has been reached.

Prior art boring and digging devices have suffered from many of the same deficiencies as the sampling devices. Namely, excessive force is required to penetrate the soil. In addition, the length of most devices is either too short for plants with very deep root systems, or too long for plants with shallow root systems, or both. It is therefore difficult to ensure that water and nutrients are delivered to a location where they will be quickly absorbed by the roots.

The protective component of a plant maintenance system consists primarily of placing an effective barrier between the plant and any potential sources of injury. Chemical barriers are commonly used to prevent insect-inflicted injury, while physical barriers are used to prevent domestic animal and human-inflicted injury.

One way in which humans commonly damage plants is by careless use of string trimmers and similar tools. For instance, while trimming the grass near a small sapling, a maintenance worker may come too close to the sapling, allowing the line from the trimmer to strike and scar the base of the plant. Other damage may come from household pets who dig and paw around the stems of plants. This type of damage is avoided by erecting a guard at the base of the plant. Such guards not only protect the plant from string trimmers and household pets, but they may protect the pets by preventing them from ingesting chemical fertilizers or insecticides which may have been deposited near the roots of the plant.

A typical prior art plant guard consists of a sheet of flexible material which is wrapped around the plant to form a tubular sheath, and secured in place by nailing. An obvious drawback of this type of guard is that the nail itself causes injury to the plant. Another drawback is that the guards include no provision for adapting to the constantly increasing girth of the plant. Thus, it is necessary to replace each guard with a larger diameter guard as the base of the plant becomes thicker This can become exceedingly bothersome when certain rapidly-growing species of trees are involved.

It would be highly advantageous, therefore, to remedy the foregoing and other deficiencies inherent in each of the above type of landscape maintenance tools.

Accordingly, it is an object of the present invention to provide an improved vegetation maintenance system.

Another object of the invention is the provision of complementary tools for sampling and/or treating the soil near a plant, and subsequently protecting the plant and treated area from outside intrusion.

And another object of the invention is to provide a soil extraction tool with means for completely expelling a plug of soil from its interior after use.

Still another object of the invention is the provision of a soil extraction tool with detachable segments for selectively varying the length of the device to correspond to different root depths.

Yet another object of the invention is to provide a soil extraction tool with a sharpened bottom end and an anvil surface formed at its upper end for facilitating penetration of hardened ground.

Yet still another object of the invention is the provision of an improved guard member for protecting a plant in soil which has been diagnosed and treated using the aforementioned soil extraction tool.

And a further object of the invention is to provide a self-supporting plant guard which does not require the use of nails or other hardware.

And still a further object of the invention is the provision of an adjustable plant guard, the size of which can be selectively varied to accommodate a rapidly growing plant.

And yet a further object of the invention is to provide a plant guard with an outwardly tapering base for conforming to the outwardly tapering base of a tree trunk.

And yet still a further object of the invention is the provision of a plant guard with openings for allowing air and sunlight to reach the bottom of the plant.

And still a further object of the invention is the provision of complementary landscaping tools, according to the foregoing, which are relatively inexpensive to manufacture and comparatively simple and easy to use.

SUMMARY OF THE INVENTION

Briefly, to achieve the desired objects of the instant invention in accordance with the preferred embodiments thereof, a vegetation maintenance system including a soil extraction tool and a plant guard is provided.

The soil extraction tool of the instant invention comprises an elongated tubular member having a sharpened, open lower end and a longitudinally extending opening. The tubular member is supported at the lower end of a shaft comprising a plurality of extensions, each having female coupling means at one end and male coupling means at the other end. A T-handle having an anvil or striking surface is securable to any one of the extensions. A plunger is mounted for reciprocation within the tubular member.

The plant guard of the instant invention comprises a semi-rigid sheet of material having integrally formed fastening means for detachably securing the opposite ends of the sheet in adjustable, overlapping relationship to one another to form a tubular sheath for surrounding a plant. In a preferred embodiment, the fastening means comprise a plurality of projections provided at spaced apart locations along the mid-line of the sheet, and a plurality of apertures located in alternating relationship with the projections. The projections are snapped into the apertures to lock the sheath in a closed, upright position. A plurality of circular openings is formed in the flexible sheet to allow air and sunlight to reach the base of the plant. Semi-circular openings are formed along the bottom edge of the sheet to increase the flexibility of the bottom edge, allowing the guard to taper outwardly at its base to conform to the outwardly tapering trunk of a tree.

BRIEF DESCRIPTION OF THE DRAWINGS

The foregoing and further and more specific objects and advantages of the instant invention will become readily apparent to those skilled in the art from the following detailed description of preferred embodiments thereof take in conjunction with the drawings in which:

FIG. 1 is a perspective view showing a soil extraction tool according to the instant invention;

FIG. 2 is an exploded perspective view, with portions broken away, of the soil extraction tool of FIG. 1;

FIG. 3 is a perspective view showing the soil extraction tool of FIG. 1, with the handle and extenders removed, and the plunger being actuated to expel a plug of soil;

FIG. 4 is a fragmentary perspective view, with portions broken away, showing a soil extraction tool according to a second embodiment of the invention;

FIG. 5 is a fragmentary perspective view showing a soil extraction tool according to a third embodiment of the invention;

FIG. 6 is a perspective view showing a plant guard according to the present invention erected around a very young plant;

FIG. 7 is an enlarged, fragmentary front view of the plant guard of FIG. 6 in unrolled configuration;

FIG. 8 is a sectional view taken through line 8—8 of FIG. 7;

FIG. 9 is a perspective view, similar to FIG. 6, showing the plant guard with its diameter adjusted to accommodate the plant at a later stage of growth; and FIG. 10 is a fragmentary perspective view showing the fasteners of the plant guard in detail.

DETAILED DESCRIPTION OF THE PREFERRED EMBODIMENT

Turning now to the drawings in which like reference characters indicate corresponding elements throughout the several views, attention is first directed to FIG. 1, which shows a soil extraction tool 10 for use in the vegetation maintenance system of the instant invention. The tool 10 may be used as either a core sampling device, for extracting a plug of soil 12 for diagnostic purposes, or as a digging implement, for creating a hole 14 for deep watering or delivering nutrients or medications and the like to the feeder roots of a plant.

Still referring to FIG. 1, with additional reference to FIG. 2, the tool 10 comprises an elongated shaft 16 carrying a tubular member 18 defining a soil receiving chamber 20 at its lower end. A T-shaped handle 22 is secured to the upper end of the shaft 16. A flattened striking surface or anvil 24 is formed on the top center portion of the handle 22 for receiving blows from a hammer or the like to drive the tool 10 into hardened soil.

As best seen in FIG. 2, the tubular member 18 includes an open bottom end 26 and a longitudinally extending opening or slot 27, both communicating with the soil receiving chamber 20. The lower edge 28 of the member 18 surrounding the open end 26 is sharpened to facilitate penetration into the soil. The upper portion of the tubular member 18 includes a shoulder 30, which forms an end wall of the soil receiving chamber 20. The shoulder 30 merges with a shank 32 defining a reduced diameter bore 34 communicating with the soil receiving chamber 20. A fastening element, such as screw threads 36, are formed on shank 32 for cooperating with a mating element 38 on the lower end of the shaft 16 to detachably secure the tubular member 18 to the shaft 16.

A plunger 40 is provided for forcibly ejecting a plug of soil 12 from the interior of the soil receiving chamber 20. The plunger 40 comprises an enlarged disk or ram portion 42 which is mounted for reciprocation in the soil receiving chamber 20. The disk is carried at the end of an elongated actuating stem or rod 44 which extends through the reduced diameter bore 34 in the shank 32, and projects through the top surface of the shank 32. A knob or grip member 46 is formed at the upper end of the rod 44.

The elongated shaft 16 comprises a number of tubular extender elements. For purposes of illustration, two such elements 16a, 16b are shown. However, any number of extenders may be used, depending on the depth to which the user wishes to penetrate. Each extender member 16a, 16b includes a fastening element 38 at its lower end and a complimentary fastening element 48, identical in structure to the fastening element 36 on the shank 32 of the tubular member 18, at its upper end. The lower end of the T-shaped handle 22 of the tool 10 also includes a fastening element 38, allowing it to be detachably mounted at the top of any of the extender members 16a, 16b or directly on the shank 36 of the tubular member 18. The diameter of the bore 50 defined by each of the extender members 16a, 16b is slightly greater than the diameter of the knob 46 at the end of the actuating stem 44, to allow unrestrained reciprocation of the plunger 40 therein To extract a soil sample or dig a hole using the tool 10 of the present invention, a user drives the tubular member 18 and shaft 16 into the ground by striking the anvil surface 24 or bearing down on the T-handle 22. The downward movement of the tubular member 18 through the ground causes an upward force against the ram portion 42 of the plunger 40, causing the plunger to travel upwardly in the soil receiving chamber 20 until it reaches the end wall formed by the stop shoulder 30. Loosened soil then enters the soil-receiving chamber 20 through the longitudinally extending opening 27. Once the desired depth has been reached, the user extracts the plug of soil 12 in the chamber 20 from the ground by simply pulling up on the T-shaped handle 22. The user then removes the handle 22 and extender members 16a, 16b from the tubular member 18, and expels the plug of soil 12 from the chamber 20 by pressing down on the plunger 40, as illustrated in FIG. 3.

FIG. 4 shows an alternate embodiment 10A of the invention, which allows a user to depress the plunger 40 without removing the handle 22 and extender members 16a, 16b. The tubular member 18, plunger 40 and extender members 16a, 16b are identical in structure to the same elements in FIGS. 1-3, but the T-shaped handle 22 has been modified by adding a Schraeder valve 52 to which a hose 54 connected to a source of pressurized gas may be coupled. The pressurized gas enters the hollow lower portion of the handle 22, which communicates with the bore 50 of each of the extender member 16a, 16b, and exerts a downward force on the knob 46 of the plunger 40, causing the plunger 40 to descend.

In another embodiment 10B of the invention, shown in FIG. 5, a spring 56 is positioned between the shank of the tubular member 18 and the knob 46 of actuating stem 44. The spring urges the knob upwardly, causing the ram portion of the plunger 40 to return automatically to a retracted position against stop shoulder 30 as soon as the plunger is released As a result, the tubular member 18 encounters less resistance from the soil when first inserted into the ground, and less physical exertion by the user is required.

Before, while, and after the soil surrounding a particular plant 58 has been analyzed and/or treated using the soil extraction tool of FIGS. 1-5, it is necessary to protect the plant and soil from externally-inflicted physical damage or the intrusion of foreign substances. At the same time, it is necessary to prevent small children and animals from touching or ingesting the potentially toxic chemicals or the like with which the soil may have treated. Both of these objectives may be achieved by surrounding the plant 58 with the plant guard 60 illustrated in FIGS. 6-10.

The plant guard 60 is constructed from a sheet of plastic material having a front side 61, rear side 62, top edge 63, bottom edge 64, and a pair of spaced apart ends 66, 68. The plastic material selected must have sufficient flexibility to allow the sheet to easily be rolled into tubular configuration, and yet be rigid enough to support itself in an upright position, as shown in FIGS. 1 and 3.

A plurality of projecting members 70 are formed on the front side 61 of the sheet, along a mid-line extending parallel to the top and bottom edges 63, 64. As best seen in FIG. 8, each projecting member comprises a post 72 having an enlarged, rounded head 74 formed at its distal end. Alternating with the projecting members is a series of apertures 76, each having a diameter less than the base of rounded head 74, and greater than or equal to the diameter of the post 72.

The guard 60, originally in the flat configuration shown in FIG. 7, is formed into a tubular sheath simply by bending about a longitudinal axis and positioning the ends 66, 68 in overlapping relationship with one another, such that the rear side 62 of the first end 66 overlies the front side of the second end 68. The diameter of the sheath is determined by the amount of overlap between the two ends, with a large overlap resulting in a small diameter sheath for surrounding a very young, thin plant 58, as shown in FIG. 6, and a smaller overlap resulting in a larger diameter sheath for surrounding a thicker plant 58 (possibly the same plant at a later stage of growth), as shown in FIG. 9.

Once the ends 66, 68 have been positioned with the appropriate amount of overlap, they are locked into place by pressing a number of the projecting members 70 proximate the second end 68 through aligned corresponding apertures 76 in the overlapping portion of the first end 66 The material from which the guard 60 is constructed must be of sufficient resilience to allow each of the apertures 76 to be flexed to a large enough diameter to receive or release the enlarged head 74 of a projecting member when desired, and to automatically return to its normal diameter to retain the head 74 when release is not desired The number of projecting members 70 in engagement with apertures 76 will correspond to the size of the overlap between the ends 66, 68. Only a few projecting members 70 and apertures 76 will be engaged in the case of a small overlap, while more projecting members 70 and apertures 76 will be engaged in the case of a large overlap.

The plant guard 60 is preferably provided with a plurality of relatively large, circular openings 78 for allowing air and sunlight to reach the base of the plant 58. The openings 78 may be arranged in a plurality of rows extending from first end 66 to second end 68 of the guard. The lowermost row preferably consists of a number of semi-circular openings 80 or other cut-outs which open along the bottom edge 64 of the guide. The semi-circular, or open, configuration of the openings 80 increases the flexibility of the bottom edge 64, so that the guard 60 can expand or bulge outwardly near its base to conform to the outward taper of a tree trunk.

Various modifications and variations to the embodiments herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the instant invention and alternately preferred embodiments thereof in such clear an concise terms as to enable those skilled in the art to understand and practice the same, the invention claimed is:

1. A soil extraction tool comprising:
 a) a tubular member including
  i) an open bottom end, ii) a soil receiving chamber communicating with said open bottom end,
iii) a longitudinally extending opening communicating with said soil receiving chamber, and
iv) an upper shoulder portion forming an end wall of said soil receiving chamber;
b) an elongated shaft secured to said upper shoulder portion, said shaft having top and bottom ends, and defining a bore communicating with said soil receiving chamber;
c) a plunger for forcibly ejecting soil from said soil receiving chamber, said plunger including
i) a ram portion mounted for reciprocation within said soil receiving chamber, and
ii) an actuating stem secured to said ram portion and mounted for reciprocation in said bore, and
iii) said actuating stem having an upper end terminating in said bore and configured for reciprocal movement therein; and
d) a handle carried at the top end of said elongated shaft.

2. A soil extraction tool according to claim 1, further comprising cooperating elements of a first engagement pair on said tubular member and on the bottom end of said shaft for detachably coupling said shaft to said tubular member.

3. A soil extraction tool according to claim 2, wherein said cooperating elements comprise:
a) a fastening element on said tubular element; and
b) a mating element on the lower end of said shaft for cooperating with said fastening element.

4. A soil extraction tool according to claim 3, wherein said fastening element and said mating element comprise mating screw threads.

5. A soil extraction tool according to claim 3, further comprising cooperating elements of a second engagement pair on the top end of said shaft and on said handle for detachably securing said handle to said shaft.

6. A soil extraction tool according to claim 5, wherein said cooperating elements of said second engagement pair comprise:
a) a fastening element on said handle; and
b) a complimentary fastening element on the upper end of said shaft for mating with said fastening element.

7. A soil extraction tool according to claim 6, wherein said fastening element and said complementary fastening element comprise mating screw threads.

8. A soil extraction tool according to claim 6, further comprising an extender member detachably securable between said shaft and said handle, said extender member having a pair of opposed ends and including:
a) first fastening means on one end for mating with said fastening element on said handle, and
b) second fastening means on the opposite end for mating with said complimentary fastening element on the upper end of said shaft.

9. A soil extraction tool according to claim 1, further comprising at least one extender member for allowing selective variation of the length of said tool.

10. A soil extraction tool according to claim 1, and further comprising a knob formed on said upper end of said actuating stem, said knob acting as a grip for manually actuating said plunger when said shaft and said handle have been removed from said tubular member.

11. A soil extraction tool according to claim 10, further comprising inlet means communicating with the bore of said shaft for receiving a pressurized fluid for exerting a downward force on said knob to depress said plunger.

12. A soil extraction tool according to claim 1, further comprising biasing means for urging said ram portion of said plunger toward said upper shoulder portion of said tubular member.

13. A soil extraction tool according to claim 12, wherein said biasing means comprises a spring carried by said actuating stem.

* * * * *